(12) United States Patent
Paniccia

(10) Patent No.: US 11,131,545 B2
(45) Date of Patent: Sep. 28, 2021

(54) MULTI-LAYER SILICON NITRIDE WAVEGUIDE BASED INTEGRATED PHOTONICS OPTICAL GYROSCOPE CHIP

(71) Applicant: Anello Photonics, Inc., Santa Clara, CA (US)

(72) Inventor: Mario Paniccia, Santa Clara, CA (US)

(73) Assignee: Anello Photonics, Inc., Santa Clara, CA (US)

( * ) Notice: Subject to any disclaimer, the term of this patent is extended or adjusted under 35 U.S.C. 154(b) by 0 days.

(21) Appl. No.: 17/095,272

(22) Filed: Nov. 11, 2020

(65) Prior Publication Data

US 2021/0140768 A1    May 13, 2021

Related U.S. Application Data

(60) Provisional application No. 62/934,184, filed on Nov. 12, 2019.

(51) Int. Cl.
| | | |
|---|---|---|
| *G01C 19/72* | (2006.01) | |
| *G02B 6/12* | (2006.01) | |
| *G02B 6/13* | (2006.01) | |

(52) U.S. Cl.
CPC ......... *G01C 19/72* (2013.01); *G02B 6/12004* (2013.01); *G02B 6/13* (2013.01); *G02B 2006/12121* (2013.01); *G02B 2006/12123* (2013.01); *G02B 2006/12138* (2013.01)

(58) Field of Classification Search
CPC ...... G01C 19/72; G02B 6/12004; G02B 6/13; G02B 2006/12121; G02B 2006/12123; G02B 2006/12138

USPC ......................................................... 356/460
See application file for complete search history.

(56) References Cited

U.S. PATENT DOCUMENTS

| | | | | |
|---|---|---|---|---|
| 5,724,462 | A * | 3/1998 | Ido | G01C 19/72 385/14 |
| 6,163,632 | A * | 12/2000 | Rickman | G01C 19/722 356/459 |
| 10,731,988 | B1 | 8/2020 | Paniccia et al. | |
| 2002/0015154 | A1 | 2/2002 | Goldner et al. | |
| 2008/0079947 | A1* | 4/2008 | Sanders | G01C 19/727 356/461 |
| 2017/0199037 | A1 | 7/2017 | Jain | |

(Continued)

OTHER PUBLICATIONS

PCT International Search Report and Written Opinion for International Application No. PCT/US2020/060289 dated Feb. 3, 2021, 20 pages.

*Primary Examiner* — Jerry M Blevins
(74) *Attorney, Agent, or Firm* — Lowenstein Sandler LLP; Madhumita Datta

(57) ABSTRACT

An integrated photonics optical gyroscope fabricated on a silicon nitride (SiN) waveguide platform comprises a first portion with silicon nitride (SiN) waveguides that constitute a rotation sensing element; and, a second portion with additional silicon nitride (SiN) waveguide-based optical components that constitute a front-end chip to launch light into and receive light from the rotation sensing element. The two portions can be stacked together to have a multi-layer configuration vertically coupled with each other. External elements (e.g., laser, detectors, phase shifter) may be made of different material platform than SiN and can be hybridly integrated to the SiN waveguide platform.

25 Claims, 9 Drawing Sheets

(56) References Cited

U.S. PATENT DOCUMENTS

2018/0079947 A1 3/2018 Contreras
2018/0259337 A1* 9/2018 Wang .................. G01C 19/721
2019/0101392 A1* 4/2019 Bischel ................ G01C 19/64

* cited by examiner

MULTI-LAYER SILICON NITRIDE WAVEGUIDE BASED INTEGRATED PHOTONICS OPTICAL GYROSCOPE CHIP

RELATED APPLICATION

This application claims the benefit of U.S. Provisional Patent Application No. 62/934,184, filed Nov. 12, 2019, entitled, "Multi-Layer Silicon Nitride Waveguide Based Integrated Photonics Optical Gyroscope Chip," the entirety of which is incorporated by reference herein.

TECHNICAL FIELD

The present disclosure relates to system-level integration of integrated photonics optical gyroscopes based on silicon nitride waveguides.

BACKGROUND

Gyroscopes (sometimes also referred to as "gyros") are devices that are able to sense angular velocity. Gyroscopes can be mechanical or optical, and vary in precision, performance cost and size. The applications include, but are not limited to, military, aircraft navigation, robotics, autonomous vehicles, virtual reality, augmented reality, gaming etc. Optical gyroscopes typically have the highest performance and are based on interferometric measurements and the Sagnac effect (a phenomenon encountered in interferometry that is elicited by rotation). Since optical gyroscopes do not have any moving parts, they have advantages over mechanical gyroscopes as they can withstand effects of shock, vibration and temperature variation better than the mechanical gyroscopes with moving parts. The most common optical gyroscope is the fiber optical gyroscope (FOG). Construction of a FOG typically involves a coil comprising several loops/turns of polarization-maintaining (PM) fiber. Laser light is launched into both ends of the PM fiber coil traveling in opposite directions. If the fiber coil is moving, the optical beams traveling in opposite directions experience different optical path lengths with respect to each other. By setting up an interferometric system, one can measure the small path length difference that is proportional to the area of the enclosed loop and the angular velocity of the rotating fiber coil.

Phase signal of an optical gyro is proportional to the Sagnac effect times the angular rotation velocity, as shown in the following equation:

$$\Delta\phi = (8\pi NA/\lambda c)\Omega$$

where, N=number of turns in the gyro; A=area enclosed; $\Omega$=angular rotation velocity; $\Delta\phi$=optical phase difference signal; $\lambda$=wavelength of light; and c=speed of light.

These FOGs can have very high precision, but at the same time, they are of large dimension, are very expensive, and are hard to assemble due to the devices being built based on discrete optical components that need to be aligned precisely. Often, manual alignment is involved, which is hard to scale up for volume production.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect of the present disclosure, an integrated photonics optical gyroscope fabricated on a silicon nitride (SiN) waveguide platform comprises a first portion with silicon nitride (SiN) waveguides that constitute a rotation sensing element; and, a second portion with additional silicon nitride (SiN) waveguide-based optical components that constitute a front-end chip to launch light into and receive light from the rotation sensing element. The rotation sensing element comprises a coil with multiple turns or a microresonator ring. External elements (e.g., laser, detectors, phase shifter etc.) may be made of different material platform than SiN and can be hybridly integrated to the SiN waveguide platform.

The two portions can be stacked together to have a multi-layer configuration coupled with each other. Note that the term "layer" in the specification and drawings is defined broadly to encompass functional portions or sections of a device platform. A same physical layer can have multiple portions. For example, though the front-end chip is described as 'layer 1' and the rotation sensing coil is described as 'layer 2', they can both be in the same physical layer. In fact, in some embodiments, a part of the rotation sensing element can be physically located in the second portion of the SiN waveguide platform that includes the front-end chip.

In some embodiments, the first portion and the second portion of the SiN waveguide platform can be stacked vertically with respect to each other in two separate physical layers, and light evanescently couples between the first portion and the second portion of the SiN waveguide platform. In certain embodiments, parts of the rotation sensing element can be distributed among two or more sub-layers, and light evanescently couples between the vertical sub-layers of the rotation sensing element. The SiN waveguides in one sub-layer can be laterally offset from the SiN waveguides in another sub-layer to minimize vertical crosstalk.

In another aspect of the present disclosure, an integrated photonics optical gyroscope fabricated on a silicon nitride (SiN) waveguide platform is disclosed, where the gyroscope comprises: a first portion of the SiN waveguide platform comprising SiN waveguides that constitute a rotation sensing element; a second portion of the SiN waveguide platform comprising additional SiN waveguide-based optical components that constitute a front-end chip to launch light into and receive light from the rotation sensing element; and, one or more additional chips comprising optical elements fabricated using a material platform other than the SiN waveguide platform, wherein the one or more additional chips are integrated to the SiN waveguide platform.

In additional aspects, the optical gyroscope of claim 1, further comprises a first end and a second end of the rotation sensing element, wherein the first and the second end of the rotation sensing element comprise SiN waveguides and a phase shifter is coupled to at least one of the first end and the second end of the rotation sensing element.

The phase shifter can be fabricated on a separate layer made of a material other than SiN, and wherein the separate layer with the phase shifter is hybridly integrated to the first portion containing the rotation sensing element. For example, the phase shifter can be fabricated by depositing metal or piezoelectric ceramic materials (PZT) on the first portion containing the rotation sensing element. Alternatively, the phase shifter can be fabricated by growing, wafer-bonding or attaching III-V compound semiconductor material on the first portion containing the rotation sensing element. In yet another alternative embodiment, the phase shifter can be fabricated by growing, wafer-bonding or attaching a silicon photonics wafer on the first portion containing the rotation sensing element.

In some embodiments, the phase shifter is evanescently coupled to the rotation sensing element. A separate layer with the phase shifter can be disposed in a cavity etched into the SiN waveguide platform.

In some aspects, a common substrate with a light source and one or more detectors can be disposed in a cavity etched into the first portion of the SiN waveguide platform containing the additional SiN waveguide-based optical components that constitute the front-end chip.

The common substrate with the light source and the detectors can be wafer-bonded to or grown on top of the first portion of the SiN waveguide platform.

BRIEF DESCRIPTION OF THE DRAWINGS

The present disclosure will be understood more fully from the detailed description given below and from the accompanying drawings of various implementations of the disclosure. Please note that the dimensions shown in the figures are for illustrative purposes only and not drawn to scale.

DETAILED DESCRIPTION

Aspects of the present disclosure are directed to integration of compact ultra-low loss silicon nitride waveguide based angular rotation sensing component with other system-level integrated photonics components for optical gyroscope applications. The system integration is done with large scale manufacturing in mind to facilitate mass production of integrated photonics optical gyroscopes.

Figure 1:
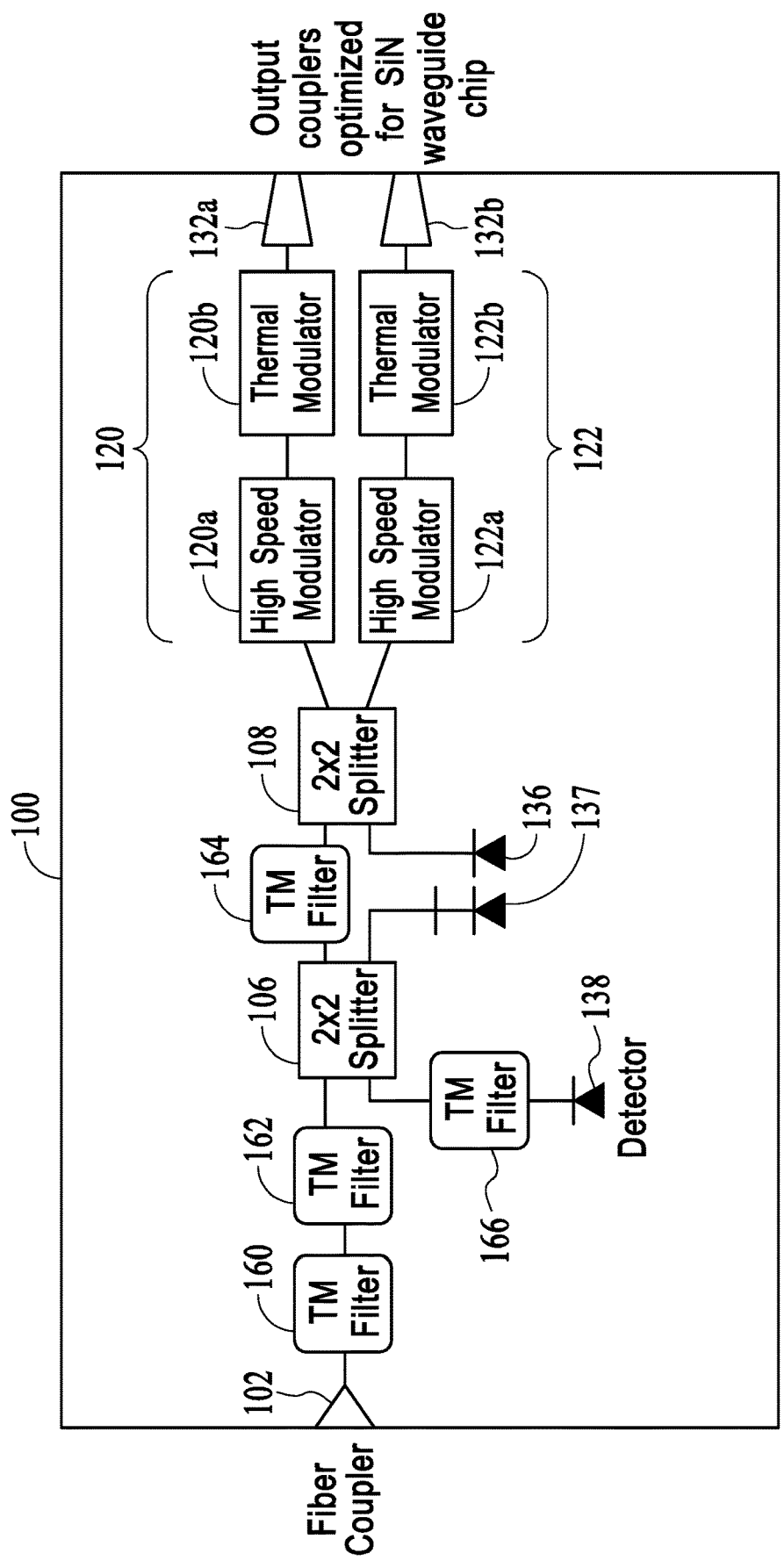
FIG. 1 is a schematic of an integrated photonics front-end chip that couples to a separate SiN waveguide-based sensing chip, according to an embodiment of the present disclosure.

Integrated optical gyroscopes may have a front-end chip made of integrated photonics components that can launch and receive light from a rotation sensing element. The rotation sensing element of the optical gyroscope can comprise a fiber loop or another integrated photonics waveguide chip (e.g, a silicon nitride waveguide-based coil or microresonator ring). FIG. 1 is a schematic of one embodiment of an integrated photonics front-end chip 100 that couples to a separate and distinct waveguide-based sensing chip that is acting as the rotation sensing element. The integrated photonics front-end chip coupled with the waveguide-based sensing chip constitute an integrated photonics optical gyroscope module which may be part of an inertial measurement unit (IMU) package. Note that IMU may have other components, such as accelerometers, in addition to the optical gyroscope module. Therefore, making the optical gyroscope module compact reduces the overall size, weight power and cost of the IMU. This weight reduction can be crucial for certain applications, for example, lightweight unmanned aerial vehicles. IMU may be a much-needed technology component for more established sensing technologies for autonomous vehicles, such as LiDAR (Light Detection and Ranging), radar and cameras that will be used in future generation of autonomous vehicles (both terrestrial and aerial).

In the waveguide-based sensing chip (sometimes also referred to as a "gyro chip"), low-loss waveguide core may be made of silicon nitride ($Si_3N_4$), and the waveguide cladding may be made of fused silica or oxide. This waveguide structure is also referred to simply as SiN waveguide, and a chip containing the SiN waveguide is referred to as a SiN waveguide chip in the figures. Fabrication process for both configurations (i.e. SiN core in fused silica or SiN core in oxide) are described in the U.S. patent application Ser. No. 16/894,120, titled "Single-layer and multi-layer structures for integrated silicon photonics optical gyroscopes," filed Jun. 5, 2020, and provisional U.S. patent application No. 63/079,928, titled, "Chemical-mechanical polishing for fabricating integrated photonics optical gyroscopes," filed Sep. 17, 2020, both of which are incorporated herein by reference.

Figure 2:
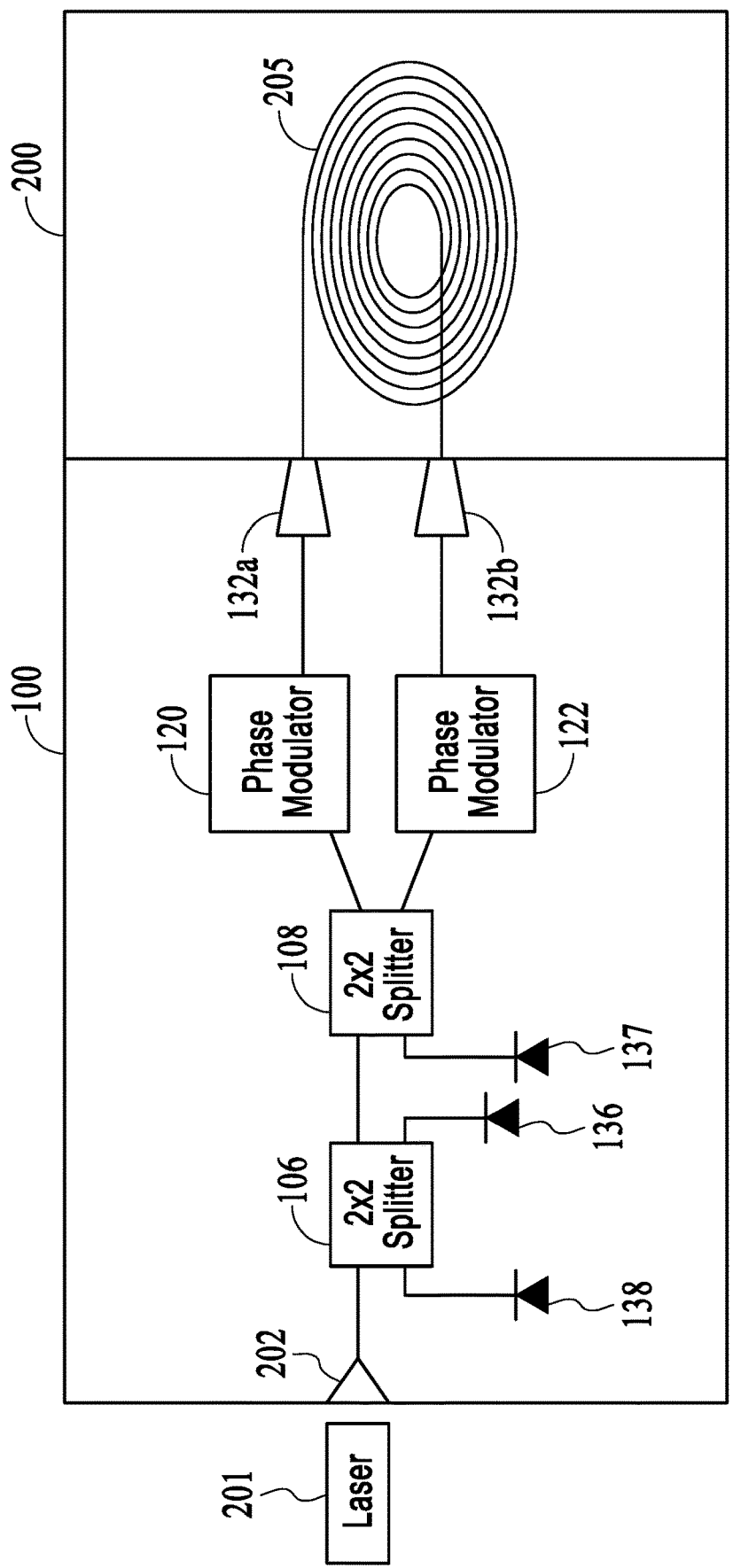
FIG. 2 is a simplified schematic of an optical gyroscope where an off-chip laser is coupled to an integrated photonics front end chip, which in turn couples to a separate SiN waveguide-based sensing chip, according to an embodiment of the present disclosure.

In the design shown in FIGS. 1 and 2, the waveguide based components on front-end chip 100 may be based on Si or III-V compound semiconductor, or a combination thereof. As shown later with FIGS. 5A and 6A, the waveguide based components of the front end chip 100 may be made of SiN also.

Referring back to FIG. 1, a light source (not shown in FIG. 1, but similar to laser 201 in FIG. 2) is coupled to the integrated photonics front-end chip 100 via a fiber, or may be aligned with lens or may be butt-coupled. The light source can be a semiconductor laser made of III-V compound semiconductor. In case of coupling the laser with a fiber, typically a single-mode (SM) fiber is used. The core size of a SM fiber is typically in the 8-10 µm range. An input waveguide on the integrated photonics front-end chip 100 may have to be designed with a flared end (input coupler 102) for efficient coupling with the SM fiber carrying the optical signal from the laser source to the integrated photonics front-end chip. An optical tap (e.g., 0.5-1% or other target amount of optical power) may send part of the optical signal to a detector to measure the coupling efficiency between the laser source and the integrated photonics front-end chip (optical taps are not shown in the figures for simplicity). Optionally, an optical phase modulator may be inserted in the optical path that eventually leads to 2×2 optical splitters 106 and 108. Note that, instead of 2×2 splitters, Y-couplers/Y-splitters may be used in certain designs.

The splitters and/or directional couplers are designed on-chip to guide light coming back from the sensing chip into the detector 138. Detector 138 may be referred to as Sagnac detector—this is the key detector in the integrated photonics front-end chip 100 for phase measurement. The detector 138 may have to be isolated by implant around it (not shown) to block stray light. In addition to the Sagnac detector 138, additional detectors 136 and 137 may be incorporated to measure (for testing and/or monitoring) propagation and coupling losses at various places along the integrated silicon photonics chip as well as to measure coupling efficiency between the integrated silicon photonics chip and the SiN waveguide chip. The detectors can be PIN or avalanche photodiodes that convert light to electrical signal. Note that implant regions may be created around other waveguide-based components (in addition to the Sagnac detector), such as the splitters, couplers etc. to minimize stray light bouncing around in the chip.

Phase modulators may be incorporated in one or both of the two output branches of the waveguide leading to output couplers 132a and 132b that are optimized for coupling out to the SiN waveguide based sensing chip with a sensing coil/ring resonator. In the non-limiting embodiment shown in FIG. 1, there are phase modulators/phase shifters 120 and 122 on both the output branches. Each branch may have both a high-speed modulator (120a and 122a) and a thermal modulator (120b and 122b), or just a high-speed modulator, or just a thermal modulator. Also, in some embodiments, only one branch may have phase modulator (high-speed, thermal, or a combination of high-speed and thermal), while the other branch does not have any phase modulator. In addition, mode-selective filters (such as TM filters which filters out most of the transverse-magnetic (TM) mode while passing transverse-electric (TE) mode) may be placed at various locations (e.g., 160, 162, 164 and 166) along the path of the optical beam. TM filters may be placed in multiple stages to improve extinction ratio between the TE and TM modes. Details of mode-selective filters and waveguide structures are covered in co-pending co-owned provisional application 62/904,443 filed on Sep. 23, 2019, titled, "System Architecture for Silicon Photonics Optical Gyroscopes with Mode-Selective Waveguides," which was converted to non-provisional application Ser. No. 16/659,424, entitled, "System Architecture for Integrated Photonics Optical Gyroscopes," filed Oct. 21, 2019, and issued as US patent.

FIG. 2 is a simplified schematic of an optical gyroscope where an off-chip laser 201 is coupled to an integrated photonics front end chip 100 via input coupler 202 (which could be a fiber coupler like 102, or could be optimized for butt-coupling). Note that laser may also be on-chip, i.e. integrated onto front end chip 100 via bonding or hybrid laser approach. The front-end chip 100 couples to a separate SiN waveguide-based sensing chip 200, according to an embodiment of the present disclosure. Note that for simplicity, some components of front-end chip 100 that are shown in FIG. 1 are not shown in FIG. 2. Sensing chip 200 may have a waveguide based sensing coil 205 as shown in FIG. 2, or may have ring resonators in certain embodiments.

A non-limiting illustrative dimension of the SiN waveguide in sensing chip 200 is a height (i.e. thickness of the patterned waveguide core layer) of 90 nm and a lateral width of 2.8 µm. Persons skilled in the art would appreciate that these illustrative dimensional values mentioned in the specification are not limiting to the scope of the disclosure. To lower waveguide loss, it may be beneficial to have symmetric upper and lower claddings around the SiN core. This structure may be obtained via wafer bonding of fused silica wafers or other suitable materials like oxide. The thickness of the waveguide SiN layer may vary between 60-100 nm and the width may vary between 2-5 µm depending on the desired optical mode. The design of the output couplers 132a and 132b varies based on waveguide dimensions on the SiN waveguide-based sensing chip 200.

Figure 4:
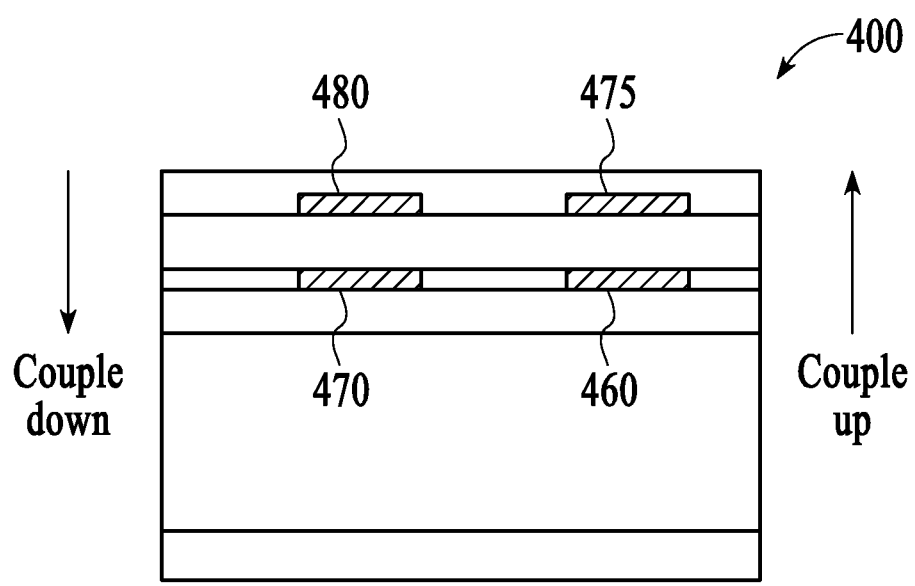
FIG. 4 schematically illustrates a longitudinal cross-sectional view (i.e. side view) of a multi-layer silicon nitride waveguide based integrated photonics optical gyroscope, according to an embodiment of the present disclosure.

The present inventors recognize that distributing the SiN waveguide based sensing coil 205 into different layers (e.g., two or more layers) leads to better performance without increasing the form factor. As shown in the cross section of the SiN chip in FIG. 4, multi-layer design requires the light coupled at the input waveguide 460 in the bottom layer to couple up from the bottom layer to the top layer (where parts 475 and 480 of the waveguide based sensing coil reside) and then again couple down from the top layer to the bottom layer to be coupled out at the output waveguide 470. Note that the multi-layer configuration can be achieved via die stacking or via growth and processing of materials in multiple layers.

Details of a multi-layer gyro configuration are covered in co-pending co-owned provisional application 62/858,588 filed on Jun. 7, 2019, titled, "Integrated Silicon Photonics Optical Gyroscope on Fused Silica Platform." A follow-up provisional application 62/896,365 filed on Sep. 5, 2019, titled "Single-layer and Multi-layer Structures for Integrated Silicon Photonics Optical Gyroscopes" describes additional embodiments. These two provisionals are converted into an U.S. utility application Ser. No. 16/894,120, titled, "Single-layer and Multi-layer Structures for Integrated Silicon Photonics Optical Gyroscopes" filed Jun. 5, 2020. These applications are incorporated herein by reference.

Figure 3:
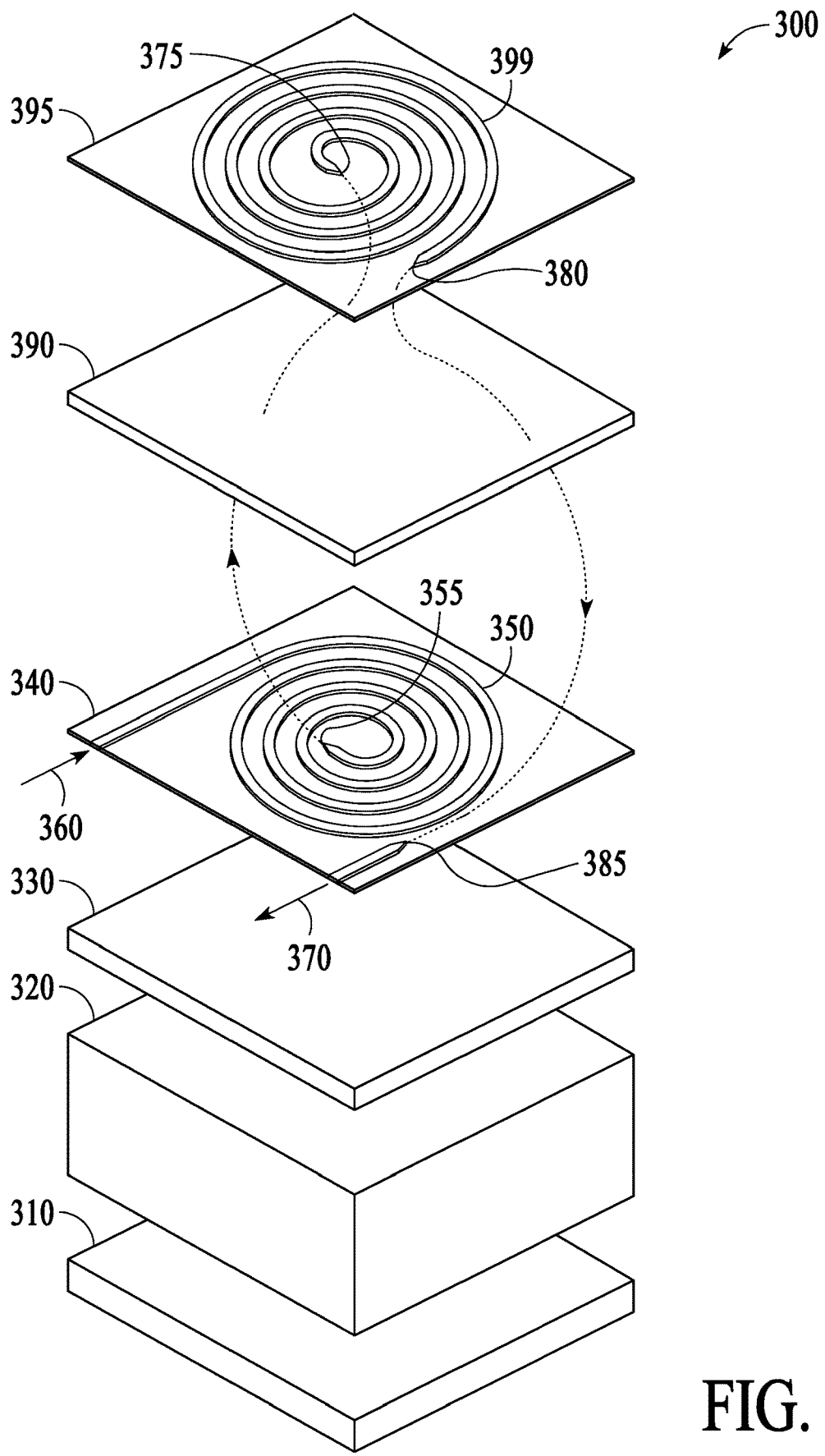
FIG. 3 schematically illustrates an isometric view of different layers of a multi-layer silicon nitride waveguide based integrated photonics optical gyroscope, where the waveguide coil is distributed among two layers, according to an embodiment of the present disclosure.

FIG. 3 is an exploded perspective view of a spiral waveguide based SiN sensing chip 300 where the output SiN waveguide does not intersect with the turns of the waveguide based sensing coil. There are portions of the coils both on the top plane and the bottom plane, and the output SiN waveguide comes out from the same plane as the input SiN waveguide. This is an important aspect of the design, because efficient coupling with external components (e.g., lasers, detectors etc.) depends on the on the output SiN waveguide and the input SiN waveguide to be on the same plane. Also, by distributing the total length of the sensing coil between two layers (top and bottom), intersection of SiN waveguides can be avoided, which is a problem the conventional photonic gyros encounter, as the direction of propagation of light has to remain the same within the sensing coil. In addition intersecting waveguides increases the scattering loss which the design in FIG. 3 can avoid.

In FIG. 3, the substrate 320 could be fused silica, or accomplished though other materials processing (e.g., Si and oxide). For example, layers 310, 330, 340, 390 and 395 are also fabricated via oxide and nitride growth (the spiral waveguides of the sensing coil being nitride code surrounded by oxide cladding). The input end of the sensing coil that receives an optical signal is denoted as 360, wherein the output end is denoted as 370. The waveguide based sensing coil has a bottom portion 350 that spirals inwards to the tapered tip 355, where it couples up to the top layer 395 that has the rest of the waveguide based sensing coil (top portion 399). Thickness of a layer 390 (typically an oxide layer in between the layers 340 and 395) sets the coupling gap. The top portion 399 of waveguide based sensing coil starts from the tapered tip 375, and spirals outwards to the other tapered tip 380, from where light couples down to the tapered tip 385 of the waveguide on the bottom plane to go out via output port 370 (to a detector or other optical system components). The arrowed dashed lines show the coupling up and coupling down between the tapered tips in the two planes. The taper design and the vertical separation between the two layers with waveguides dictate coupling efficiency between the two planes. In order for light to couple between the two vertical planes, the tapered tips 355 and 375 must have some overlap, and the tapered tips 380 and 385 must have some overlap.

Figures 5A, 5B:
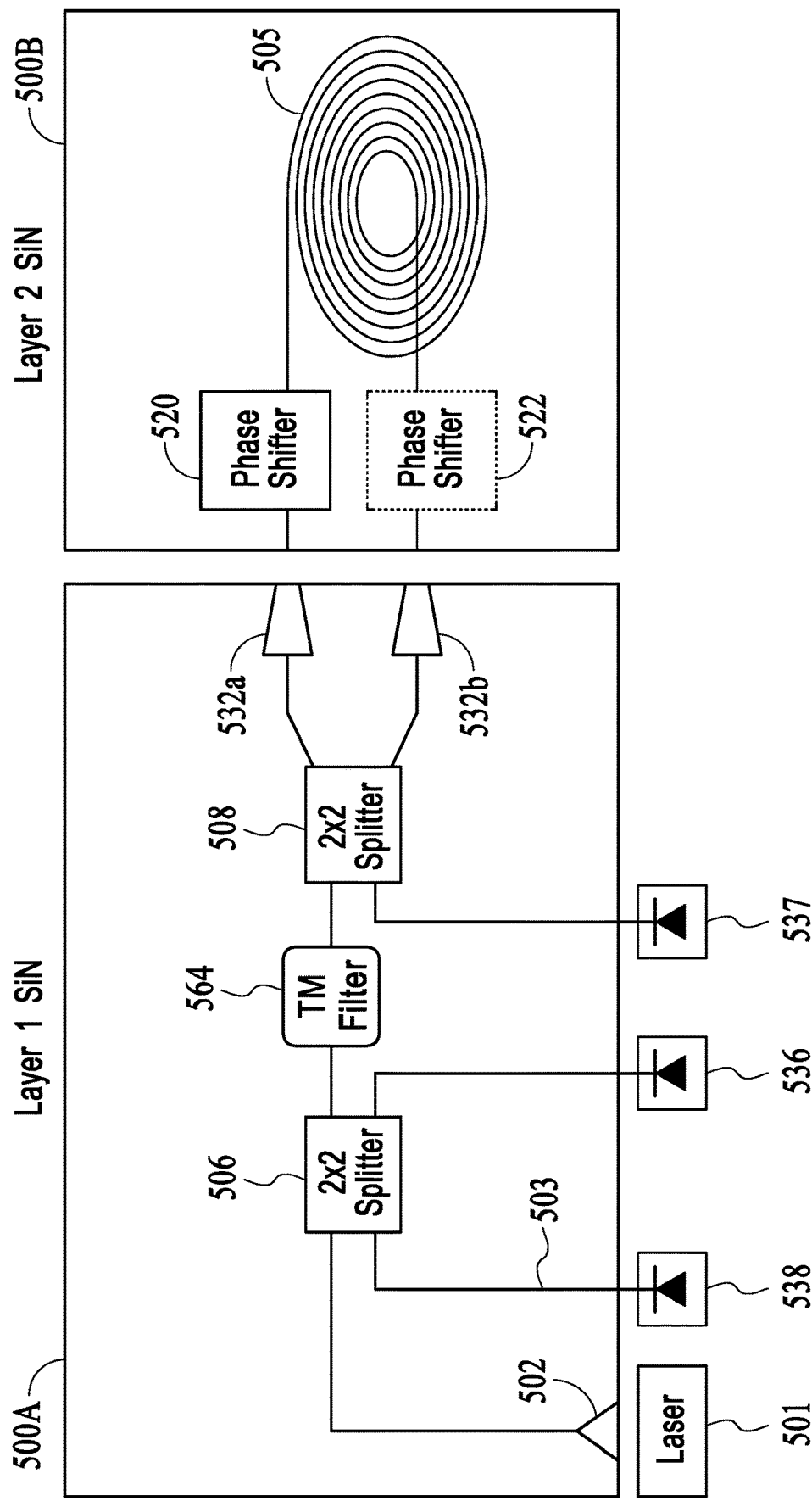
FIG. 5A schematically illustrates distribution of silicon nitride waveguide components in a first layer of two layers of an integrated photonics optical gyroscope, according to an embodiment of the present disclosure.
FIG. 5B schematically illustrates distribution of silicon nitride waveguide components in a second layer of two layers of an integrated photonics optical gyroscope, according to the embodiment of the present disclosure shown in FIG. 5A.

FIGS. 5A and 5B schematically illustrate distribution of silicon nitride waveguide components in two or more layers in a multi-layer configuration, according to an embodiment of the present disclosure. Simply put, all the integrated photonics waveguide based optical components that are typically in a front-end chip and the waveguide-based sensing coil 505 are composed of SiN waveguides, fabricated using the same SiN waveguide fabrication technology, and are distributed among two or more SiN layers. Since the laser 501 and detectors 536, 537 and 538 are fabricated using a different material system (i.e. not SiN), those would be the only components that would be outside of the multi-layer SiN die. Laser 501, input coupler 502, splitters 506 and 508, TM filter 564, output couplers 532a and 532b, and detectors 536, 537, 538 are functionally equivalent to elements 201, 202, 106, 108, 132a, 132b, 136, 137 and 138 shown in FIG. 2.

Figures 6A, 6B:
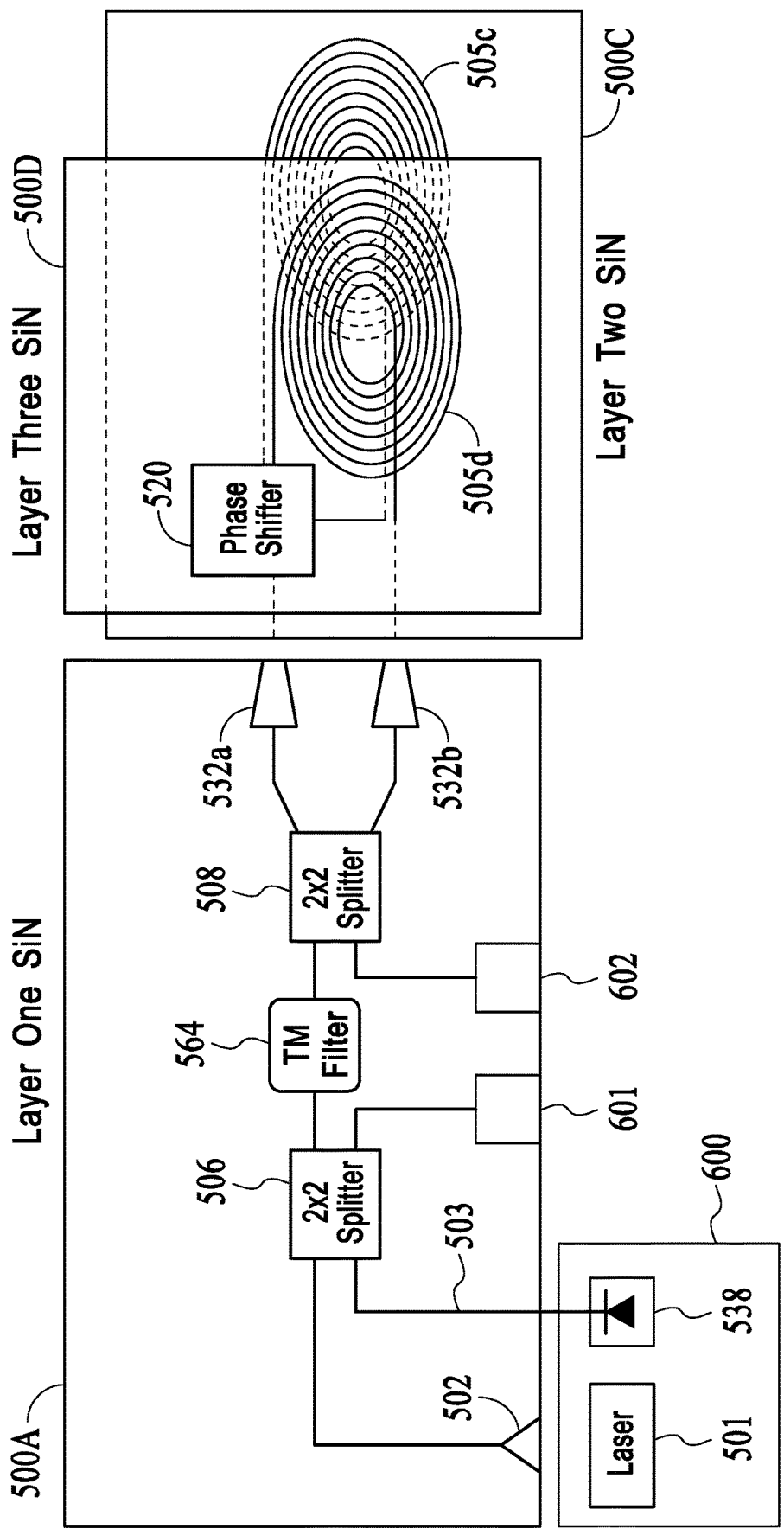
FIG. 6A schematically illustrates distribution of silicon nitride waveguide components in a first layer of three layers of an integrated photonics optical gyroscope, according to another embodiment of the present disclosure, where a laser and a Sagnac detector are housed on a common substrate for self-aligned coupling with the integrated photonics components in the first layer.
FIG. 6B schematically illustrates distribution of silicon nitride waveguide components in a second layer and a third layer of three layers of an integrated photonics optical gyroscope, according to the embodiment of the present disclosure shown in FIG. 6A.

Specifically, FIG. 5A shows an example two-layer SiN die configuration. In this embodiment, the first layer 500A of SiN comprises the input and output couplers, directional couplers, splitters, and filters, but not the phase modulators on the output branches of the waveguide. Instead, a phase shifter 520 is integrated with one end of the sensing coil 505 in the second layer 500B of SiN. Note that optionally there may be an additional phase shifter 522 on the other end of the sensing coil too. The phase shifter(s) may be a metal heater (thermal phase shifter) or a piezo-based phase shifter. This may be accomplished thru depositing metal or PZT material or via wafer bonding of III-V wafer or even silicon photonics wafer. Though in this example the entire sensing coil 505 is shown on the second layer 500B, persons skilled in the art would appreciate that portions of the sensing coil 505 may reside in the first layer 500A also in alternative embodiments similar to what is shown in FIG. 3. Also, output couplers 532a and 532b may enable vertical coupling between the two layers of SiN (as discussed in FIG. 3) rather than assisting with mode matching along the propagation direction in one layer. Note that since the laser 501 and the detectors are outside of the SiN chip, they need to be aligned with the corresponding waveguide components on the SiN layer 500A. FIG. 6A shows the laser and the Sagnac detector 538 may be supported by the same substrate in module 600 which is then aligned to the layer 500A of the SiN die. The physical separation between the laser 501 and the detector 538 should match the physical separation of the waveguides on the SiN layer 500A. When the laser is aligned with the input coupler 502, the detector is automatically aligned to the directional coupler 503 without having to separately align the laser and the Sagnac detector. This design also automatically isolates the Sagnac detector from unwanted stray light that may leak into the substrate of layer 500A.

FIG. 6A shows that in some embodiments instead of having detectors 536 and 537, the waveguide ends may lead to implant regions 601 and 602 to absorb light. Note that implant regions may be created around other waveguide-based integrated photonics components (e.g., splitters, couplers etc.) to minimize stray light bouncing around in the chip. Stray light can come from the waveguide components (splitters/couplers etc.) or from other layers. Examples of implants around waveguide-based integrated photonics components are described in co-owned patent application Ser. No. 16/659,424 (now issued as U.S. Pat. No. 10,731, 988), entitled, "System Architecture for Integrated Photonics Optical Gyroscopes," filed Oct. 21, 2019, which claims priority from U.S. Provisional Patent Application Nos. 62/872,640, filed Jul. 10, 2019, titled "System Architecture for Silicon Photonics Optical Gyroscopes," and 62/904,443, filed Sep. 23, 2019, titled, "System Architecture for Silicon Photonics Optical Gyroscopes with Mode-Selective Waveguides," the entireties of which are incorporated herein by reference.

FIG. 6B illustrates that the waveguide based sensing coil 505 shown in FIG. 5B may be distributed among two or more vertical layers, per the concept shown in FIG. 3. This enables a greater signal for the optical phase difference as more waveguide turns can be accommodated in the two or more layers than in one layer without increasing the footprint of the sensing coil. Specifically, FIG. 6B shows that the first layer 500A of the SiN chip vertically couples to layer 500C (Layer Two SiN) which has a portion 505c of the sensing coil 505. Portion 505c of the sensing coil vertically couples to layer 500D (Layer three SiN), which has portion 505d of the sensing coil 505. Note that the direction of light in portions 505c and 505d need to be the same. Phase shifter 520 (and optionally phase shifter 522) may be fabricated on layer 500D. Note that though for illustrative clarity the two layers 500D and 500C are shown slightly laterally offset to each other, in reality the sensing coil portions 505c and 505d may be vertically aligned in a way that layer 500C is blocked from view by layer 500D when seen from the top.

Figure 7:
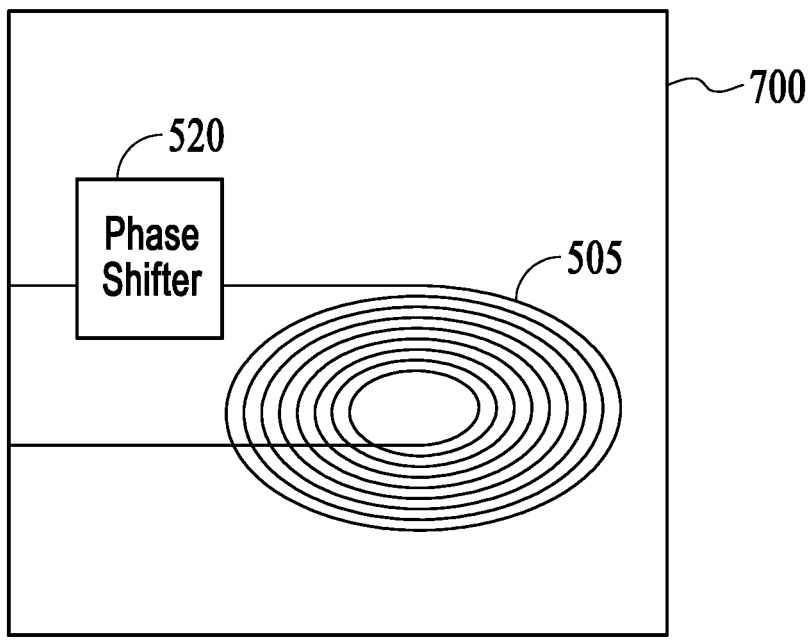
FIG. 7 schematically illustrates a top view of the integrated photonics optical gyroscope, showing the silicon nitride waveguide based sensing coil on the top layer, while other photonics components are in the bottom layer underneath the top layer, according to an embodiment of the present disclosure.
Figure 7:
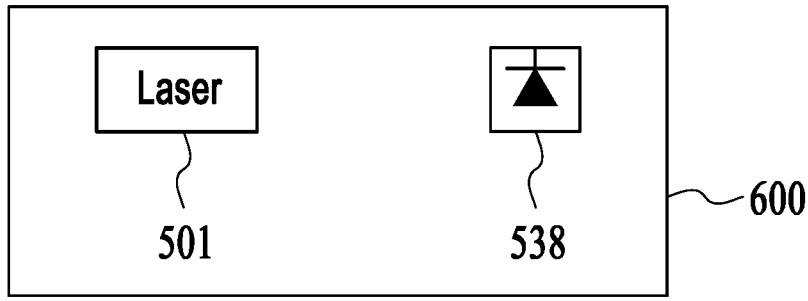

FIG. 7 schematically illustrate a top view of the integrated photonics optical gyroscope 700, showing the silicon nitride waveguide based sensing coil 505 (or portion thereof 505d) on the top layer, while other SiN waveguide based integrated photonics components are in the bottom layer underneath the top layer (and hence not visible from top), according to an embodiment of the present disclosure.

Note that in certain embodiments, the laser and detector module 600 may be coupled to the SiN optical gyroscope chip from top, as shown in FIGS. 8A-8D. The laser and detector module 600 may be bonded/grown to the SiN optical gyroscope chip or inserted into a slot etched into the SiN optical gyroscope chip.

Figure 8A:
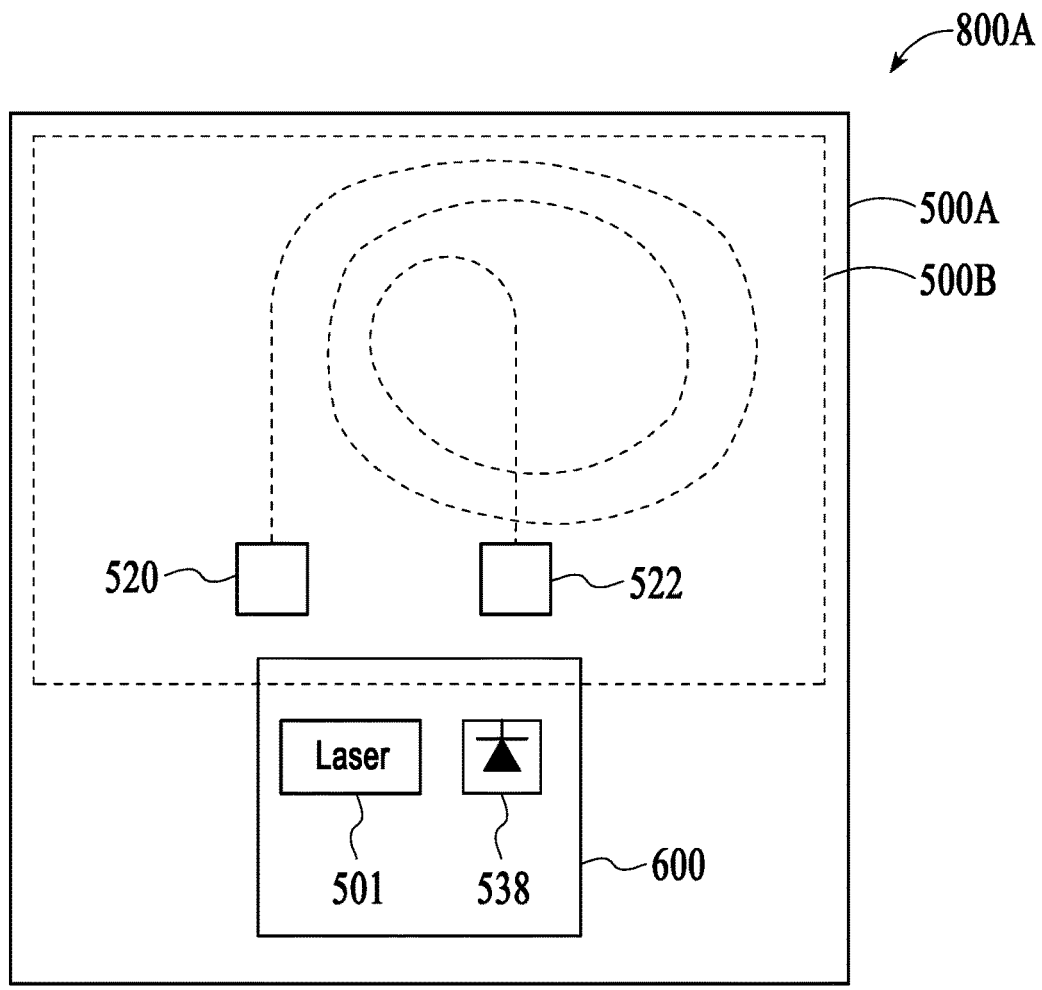
FIG. 8A illustrates a top view of the integrated photonics optical gyroscope where a laser and detector module is coupled to photonics components on a first layer of silicon nitride, while the second layer of silicon nitride with the sensing coil is underneath the first layer, according to an embodiment of the present disclosure.
Figure 8B:
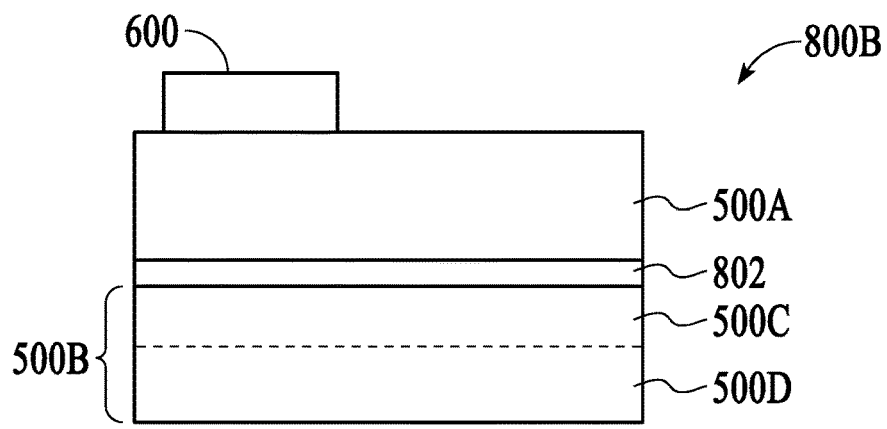
FIG. 8B illustrates a side view of the integrated photonics optical gyroscope shown in the embodiment of FIG. 8A.

Specifically, FIGS. 8A-8B show (top view 800A and side view 800B respectively) that the laser and detector module 600 is bonded or grown on top of the first SiN layer 500A that typically has the input and output couplers, directional coupler, splitters, and filters, all based on SiN waveguides. Light is evanescently (or via physical waveguide) coupled in to the input coupler to first SiN layer 500A and coupled out to the detector from the first SiN layer 500A. The sensing coil (shown in dashed line) is at least partially in the second SiN layer 500B below the first SiN layer 500A. The phase shifters 520 (and optionally 522) may be on the first SiN layer 500A. As shown in FIG. 8B, the first SiN layer 500A and the second SiN layer 500B may be vertically separated by a layer 802 which helps in evanescent coupling between the layers 500A and 500B. Also, in some embodiments, layer 500B may be subdivided into multiple sub-layers (e.g., layers 500C and 500D, though three or more layers are also possible), each sub-layer having a portion of the sensing coil.

Figure 8C:
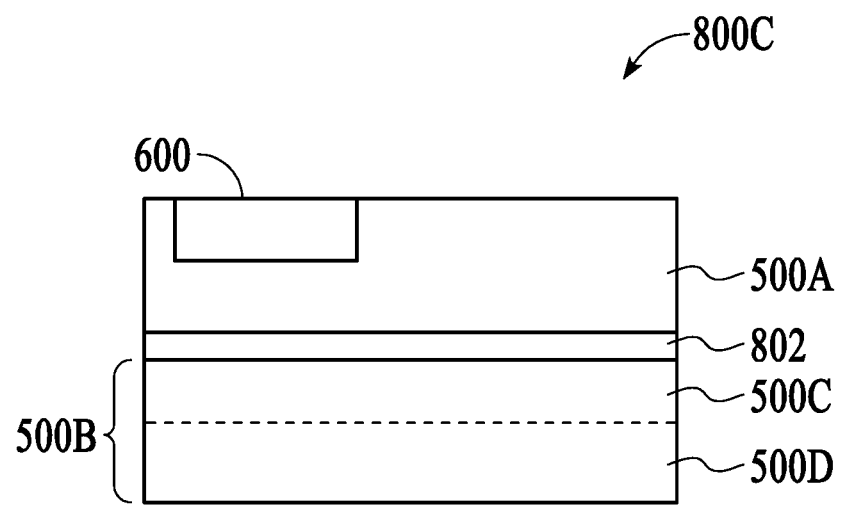
FIG. 8C illustrates a side view of the integrated photonics optical gyroscope where a laser and detector module is inserted into a cavity etched in the first layer of silicon nitride having photonics components, while the second layer of silicon nitride with the sensing coil is underneath the first layer, according to an embodiment of the present disclosure.
Figure 8D:
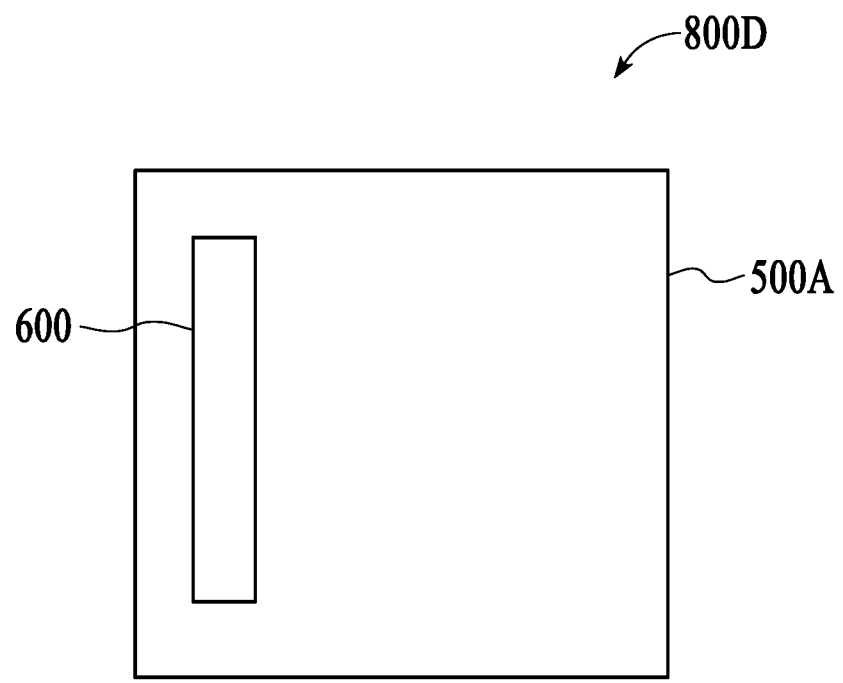
FIG. 8D illustrates a top view of the integrated photonics optical gyroscope shown in FIG. 8C.

FIGS. 8C-8D show (side view 800C and top view 800D respectively) that the laser and detector module 600 is inserted into a cavity etched in the SiN layer 500A. Etched cavity facilitates in self-alignment of the laser and the detector module 600 with the corresponding SiN integrated photonics waveguide components in SiN layer 500A. Though in FIGS. 8C and 8D the sensing coil is not shown, similar to FIG. 8B, the sensing coil may be in layer 500B, which may be sub-divided into sub-layers 500C and 500D having portions of the sensing coil.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. An integrated photonics optical gyroscope fabricated on a silicon nitride (SiN) waveguide platform comprising:
   a first portion comprising SiN waveguides that constitute a rotation sensing element; and
   a second portion comprising additional SiN waveguide-based optical components that constitute a front-end chip to launch light into and receive light from the rotation sensing element, wherein the second portion of the SiN waveguide platform is in a layer physically distinct from the first portion of the SiN waveguide platform, and is vertically coupled to the rotation sensing element in the first portion of the SiN waveguide platform.

2. The optical gyroscope of claim 1, further comprising:
   a light source that is butt-coupled or otherwise hybridly integrated with the front-end chip, wherein the light source comprises a III-V compound semiconductor.

3. The optical gyroscope of claim 2, further comprising:
   one or more photodetectors that are coupled or hybridly integrated with the front-end chip, wherein the one or more photodetectors comprise germanium or silicon-germanium.

4. The optical gyroscope of claim 3, wherein the light source and the one or more photodetectors are integrated on a common substrate which is aligned to the second portion containing the front-end chip.

5. The optical gyroscope of claim 4, wherein physical separations between the light source and the one or more detectors on the common substrate match with corresponding separations between SiN waveguide-based optical components on the front-end chip, such that when the light source is aligned with a corresponding SiN waveguide on the front-end chip, the one or more detectors are also automatically aligned to their corresponding SiN waveguides on the front-end chip.

6. The optical gyroscope of claim 4, wherein the common substrate with the light source and the detectors is disposed in a cavity etched into the first portion of the SiN waveguide platform containing the additional SiN waveguide-based optical components that constitute the front-end chip.

7. The optical gyroscope of claim 4, wherein the common substrate with the light source and the detectors is wafer-bonded to or grown on top of the first portion of the SiN platform containing the additional SiN waveguide-based optical components that constitute the front-end chip.

8. The optical gyroscope of claim 1, wherein the rotation sensing element comprises a coil with multiple turns or a microresonator ring.

9. The optical gyroscope of claim 1, wherein the first portion and the second portion of the SiN waveguide platform are stacked vertically with respect to each other.

10. The optical gyroscope of claim 9, wherein light evanescently couples between the first portion and the second portion of the SiN waveguide platform.

11. The optical gyroscope of claim 1, wherein parts of the rotation sensing element are distributed among two or more vertical sub-layers.

12. The optical gyroscope of claim 11, wherein light evanescently couples between the two or more vertical sub-layers of the rotation sensing element.

13. The optical gyroscope of claim 11, wherein SiN waveguides in one sub-layer are laterally offset from the SiN waveguides in another sub-layer to minimize vertical crosstalk.

14. The optical gyroscope of claim 1, further comprising:
   a first end and a second end of the rotation sensing element, wherein the first end and the second end of the rotation sensing element comprise SiN waveguides; and
   a phase shifter coupled to at least one of the first end and the second end of the rotation sensing element.

15. The optical gyroscope of claim 14, wherein the phase shifter is fabricated on a separate layer made of a material other than SiN, and wherein the separate layer with the phase shifter is hybridly integrated to the first portion containing the rotation sensing element.

16. The optical gyroscope of claim 15, wherein the phase shifter is fabricated by depositing metal or piezoelectric ceramic materials (PZT) on the first portion containing the rotation sensing element.

17. The optical gyroscope of claim 15, wherein the phase shifter is fabricated by growing, wafer-bonding or attaching III-V compound semiconductor material on the first portion containing the rotation sensing element.

18. The optical gyroscope of claim 15, wherein the phase shifter is fabricated by growing, wafer-bonding or attaching a silicon photonics wafer on the first portion containing the rotation sensing element.

19. The optical gyroscope of claim 14, wherein the phase shifter is evanescently coupled to the rotation sensing element.

20. The optical gyroscope of claim 15, wherein the separate layer with the phase shifter is disposed in a cavity etched into the SiN waveguide platform.

21. An integrated photonics optical gyroscope fabricated on a silicon nitride (SiN) waveguide platform, the gyroscope comprising:
- a first portion of the SiN waveguide platform comprising SiN waveguides that constitute a rotation sensing element;
- a second portion of the SiN waveguide platform comprising additional SiN waveguide-based optical components that constitute a front-end chip to launch light into and receive light from the rotation sensing element, wherein the second portion of the SiN waveguide platform is in a layer physically distinct from the first portion of the SiN waveguide platform, and is vertically coupled to the rotation sensing element in the first portion of the SiN waveguide platform; and
- one or more additional chips comprising optical elements fabricated using a material platform other than the SiN waveguide platform, wherein the one or more additional chips are integrated to the SiN waveguide platform.

22. The optical gyroscope of claim 21, wherein at least one of the one or more additional chips comprises a light source that is butt-coupled, grown, attached, wafer-bonded or otherwise hybridly integrated with the front-end chip, wherein the light source comprises a III-V compound semiconductor.

23. The optical gyroscope of claim 22, wherein at least one of the one or more additional chips comprises one or more photodetectors that are coupled, grown, attached, wafer bonded, or otherwise hybridly integrated with the front-end chip, wherein the one or more photodetectors comprise germanium or silicon-germanium.

24. The optical gyroscope of claim 22, wherein at least one of the one or more additional chips comprises a phase shifter that is coupled, grown, attached, wafer-bonded, or otherwise hybridly integrated with the rotation sensing element.

25. The optical gyroscope of claim 24, wherein the phase shifter is made of metal, PZT, III-V compound semiconductor or silicon photonics components.

* * * * *